United States Patent Office 3,223,291
Patented Dec. 14, 1965

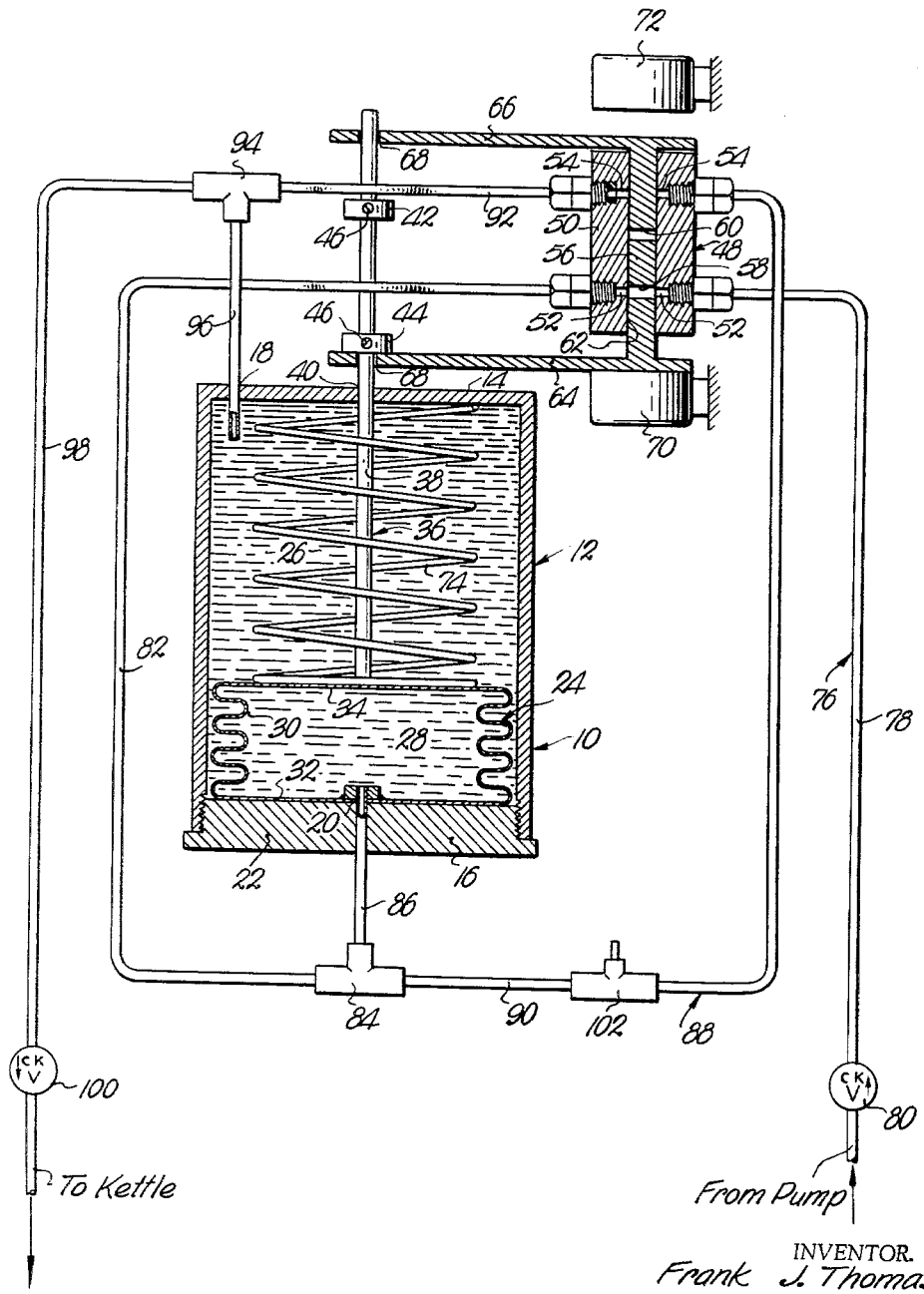

3,223,291
MEASURED CHARGE DISPENSER
Frank J. Thomas, Overland Park, Kans., assignor to Manley, Inc., Kansas City, Mo., a corporation of Missouri
Filed Aug. 7, 1964, Ser. No. 388,184
16 Claims. (Cl. 222—249)

This invention relates to fluid flow control and, more particularly, to apparatus for controlling the flow of liquid seasoning to the popping kettle of a popcorn machine.

Liquid seasoning, such as coconut oil or the like, is generally pumped to the kettle of a popcorn machine by a manually actuated pump of the type operated by a rotatable handle. Each time the handle is rotated through a predetermined arc, a measured amount of seasoning is delivered to the kettle. If the handle is rotated through a greater arc, or if the handle is rotated a second time through the predetermined arc, more than the required amount of seasoning will flow into the kettle.

Heretofore, there has been no limiting means provided with pumps of the type described to prevent a machine operator from rotating the handle of the pump more than once and thereby pumping more than the required amount of seasoning into the popping kettle of the machine. Too much seasoning delivered to the kettle increases the cost of machine operation and results in an inferior product. A need has therefore arisen for apparatus to prevent the excessive flow of seasoning to the kettle of a popcorn machine to overcome these problems and to increase the efficiency of the machine.

The present invention is directed to apparatus for a popcorn machine which is adapted to be placed between the pump and the kettle thereof for permitting the passage of a predetermined amount of seasoning only after a certain time interval has elapsed. Hence, no seasoning can be delivered to the kettle during this time interval and the apparatus can be adjusted so that the time interval will not lapse until a complete popping cycle of the machine has been completed. Thus, popcorn popped in the kettle of the machine will be properly seasoned and operational costs of the machine will be maintained at a minimum inasmuch as excessive seasoning will not be used.

It is, therefore, the primary object of the present invention to provide apparatus for use with the seasoning pump of a popcorn machine to direct a predetermined amount of liquid seasoning to the popping kettle thereof only after a predetermined interval of time has elapsed, whereby no seasoning may be delivered to the kettle during the popping cycle of the machine to thereby assure the proper seasoning of the popcorn popped by the machine and preclude the waste of seasoning.

Another object of the instant invention is the provision of apparatus of the type described which automatically becomes charged for subsequent use during the aforesaid interval following the delivery of seasoning to a popping kettle upon actuation of the pump associated therewith whereby no seasoning is available to the kettle until the apparatus is charged.

Still another object of this invention is the provision of apparatus of the aforesaid character which can be regulated to vary the length of the time interval and which can be adjusted to vary the volume of seasoning delivered to the popping kettle, whereby the operating conditions of the machine can be changed as required with no substantial delay in the popping operations thereof.

Other objects of this invention will become apparent as the following specification progresses, reference being had to the accompanying drawing which comprises a single figure illustrating the structure of the control made pursuant to the concepts of the present invention.

Fluid control apparatus 10 includes a closed receptacle 12 having a pair of opposed ends 14 and 16 provided with openings 18 and 20 respectively. For purposes of illustration, receptacle 12 comprises an inverted cup-shaped element having a bottom defined by end 14 and to which a closure 22 is threadably secured, closure 22 defining end 16 of receptacle 12. An expansible member 24 is disposed within receptacle 12 and divides the latter into a pair of compartments 26 and 28, opening 18 being in fluid communication with compartment 26, and opening 20 being in fluid communication with compartment 28. Member 24 includes a bellows 30 having a pair of opposed end walls 32 and 34, wall 32 being rigidly secured to the inner face of closure 22 in any suitable manner. Wall 34 is movable toward and away from wall 32 and an actuator 36 is secured to wall 34 for movement therewith.

Actuator 36 includes a rod 38 rigid at one end thereof to wall 34 and extending through an opening 40 in end 14. A pair of collars 42 and 44, each provided with a setscrew 46, is secured in spaced relationship to rod 38 adjacent to the outer end thereof.

Valve means 48 is disposed adjacent to receptacle 12 and includes a stationary valve body 50 having a first pair of aligned fluid passages 52 therethrough, and a second pair of aligned fluid passages 54 therethrough spaced from passages 52 thereof. Shiftable structure 56 is disposed between passages 52 and between passages 54, structure 56 including a pair of fluid passages 58 and 60. When structure 56 is in the operative position illustrated in the figure, passage 58 intercommunicates passages 52 and passage 60 is spaced from passages 54. When structure 56 is in a second operative position, passage 58 is spaced from and out of alignment with passages 52 and, passage 60 is in alignment with passages 54 to intercommunicate the same. Structure 56 thus moves relative to body 50 within a bore 62 thereof and projects outwardly from bore 62 for connection at the extremities thereof with a pair of plates 64 and 66 formed of magnetically permeable material. Each of the plates 64 and 66 is provided with an opening 68 which receives rod 38 for free movement with respect thereto.

A pair of spaced magnets 70 and 72 are stationarily disposed in spaced relationship to body 50 in alignment with structure 56. Magnets 70 and 72 attract plates 64 and 66 and, when the corresponding plate is attracted to and engaged by one of the magnets, the plate is releasably held against movement away from the magnet. Thus, structure 56 is releasably held in the corresponding operative position. Movement of structure 56 in the opposite direction will cause the other magnet to attract the other plate and thereby cause structure 56 to move into its other operative position.

A coil spring 74 is disposed within receptacle 12 and engages end 14 and wall 34. Spring 74 is normally under compression for biasing wall 34 toward wall 32.

A first conduit 76 is in fluid communication with opening 20 and is adapted to be coupled to a source of fluid under pressure. Conduit 76 includes a first section 78 having one end secured to body 50 in alignment with one of the passages 52. The opposite end of section 78 is adapted to be coupled to the fluid source. A one-way check valve 80 is coupled with section 78 to prevent fluid flow back to the source. Conduit 76 includes a second section 82 coupled at one end thereof to body 50 in fluid communication with the other passage 52. The opposite end of section 82 is secured to a T 84, there being a third section 86 coupling T 84 with opening 20. When structure 56 is in the operative position shown in the figure, fluid is permitted to flow from the source through valve means 48 and into compartment 28 through opening 20.

A second conduit 88 intercommunicates openings 18 and 20. Second conduit 88 includes a first segment 90 secured at one end thereof to T 84 and at the other end thereof to body 50 in fluid communication with one of the passages 54. A second segment 92 is secured at the ends thereof to body 50 in fluid communication with the other passage 54 and to a T 94 spaced from end 14. A third segment 96 places T 94 in fluid communication with opening 18. A third conduit 98 communicates with T 94 and is adapted to be operably coupled with the popping kettle of the popcorn machine. A one-way check valve 100 across conduit 98 prevents fluid flow from the kettle to T 94. A flow regulator 102 is coupled with segment 90 for restricting the flow of fluid therethrough.

*Operation*

Apparatus 10 is placed in operation by coupling section 78 to a pumping system for liquid seasoning of the type disclosed in U.S. Letters Patent No. 2,733,841, entitled "Liquid Seasoning Pump System For Popcorn Machines," and issued February 7, 1956. Conduit 98 is adapted to be operably coupled to a kettle assembly of the type disclosed in U. S. Letters Patent No. 2,902,920, entitled "Kettle Assembly For Popcorn Machines" and issued September 8, 1959.

With collars 42 and 44 located at desired positions along rod 38 and with regulator 102 preset at a specific operative condition, liquid seasoning is directed initially into compartment 28 by actuating the pump system coupled with section 78. With valve means 48 in the operative condition shown in the figure, liquid seasoning is forced through first conduit 76 and into compartment 28 through opening 20. Bellows 30 will expand by virtue of the increased volume of seasoning within compartment 28 to in turn, move rod 38 outwardly of receptacle 12.

When collar 42 engages plate 66, the latter in turn, will be moved toward magnet 72 and plate 64 will be moved away from magnet 70. Magnet 72 will then attract plate 66 and the latter will move into abutting relationship with magnet 72. This results in passage 58 being moved out of alignment with passages 52 and passages 60 being moved into alignment with passages 54. Thus, the flow of liquid seasoning from the pump system to compartment 28 will cease and, since compartments 26 and 28 are now placed in fluid communication with each other, seasoning will flow out of compartment 28, through second conduit 88 and into compartment 26 under the influence of the restoring force of spring 74. This action will cause bellows 30 to collapse to, in turn, move rod 38 inwardly. Collar 44 will eventually engage plate 64 and move the latter toward magnet 70 and, in turn, cause the movement of plate 66 away from magnet 72. Magnet 70 will then attract plate 64 to cause shifting of structure 56 into the position thereof shown in the figure. Once again, passage 58 will be aligned with passages 52 so that liquid seasoning may be again directed into compartment 28 when the pump system, coupled with section 78 is subsequently actuated.

Apparatus 10 is now charged and ready for delivering a measured quantity of liquid seasoning to a popping kettle coupled with conduit 98. Liquid seasoning will completely fill compartment 26 and will be forced out of the latter through opening 18, segment 96, T 94, and into conduit 98 when bellows 30 is expanded against the restoring force of spring 74.

When the pump system is next actuated, liquid seasoning will flow into compartment 28 to expand bellows 30 and thereby force seasoning out of compartment 26. Since passage 60 is out of alignment with passages 54, the liquid seasoning must necessarily flow into conduit 98 and thereby into the kettle coupled therewith. A measured amount of seasoning will flow out of compartment 26 inasmuch as such flow will cease when the flow to compartment 28 is halted.

Since spring 74 causes the collapse of bellows 30, a partial vacuum is created within compartment 26 so that seasoning flowing through second conduit 88 will be drawn into compartment 26 rather than be directed into conduit 98. The time required to completely fill compartment 26 is controlled by regulator 102 inasmuch as the latter is capable of varying the cross section of segment 90 of conduit 88 and thereby regulating the volume rate of flow to compartment 26.

Different volumes of seasoning may be directed into a popping kettle coupled with conduit 98 by adjusting the relative positions of collars 42 and 44. To decrease the volume directed into conduit 98, collar 42 is shifted to a location closer to the outer end of rod 38 and once again rigidly secured to rod 38 by manipulating the corresponding setscrew 46. If this is done, collar 44 must be shifted through the same distance in the opposite direction along rod 38 so that bellows 30 will at all times move between a pair of operative locations for the corresponding settings of collars 42 and 44.

Magnets 70 and 72 are provided to prevent the "freezing" of valve means 48 as structure 56 is shifted to a position with passages 58 and 60 out of alignment with passages 52 and 54, respectively. Each of the magnets attracts the corresponding plate with a sufficient force to overcome the force of attraction of the other magnet on the other plate so as to effectively shift structure 56 to its proper operative position. In effect, the portion of body 50 containing passages 52 forms one valve section with the corresponding portion of structure 56; the remaining portion of body and the portion of structure 56 corresponding thereto, form a second valve section.

Apparatus 10 is automatically ready for charging the popping kettle of a popcorn machine with a predetermined volume of liquid seasoning when compartments 26 and 28 are completely filled as shown in the figure. The operator of the machine need only actuate the pump system coupled with section 78 to effect the transfer of a measured portion of seasoning from compartment 26 to the popping kettle. After the portion has been delivered, apparatus 10 automatically recharges itself within a predetermined period of time which can be regulated by regulator 102 so as to be long enough to prevent the delivery of seasoning to the kettle during an individual popping operation.

Having thus described the invention, what is claimed as new and desired to be secured by Letters Patent is:

1. Fluid control apparatus comprising:
   a closed receptacle having a pair of spaced openings therethrough;
   a member mounted within said receptacle between said openings for movement alternately toward the latter and disposed for dividing the receptacle into a pair of compartments;
   first conduit means for coupling one of said openings to a source of fluid under pressure to thereby permit fluid to be directed into the compartment communicating with said one opening;
   second conduit means placing said compartments in fluid communication with each other;
   valve means coupled with said first conduit means and said second conduit means for alternately blocking the flow of fluid through the second conduit means as fluid flows through said first conduit means and into the compartment communicating with said one opening when said valve means is in a first operative condition and blocking the flow of fluid through said first conduit means as fluid flows through said second conduit means when said valve means is in a second operative condition; and
   means responsive to the movement of said member for changing the operation of said valve means from one of said conditions to the other condition, whereby fluid is forced out of the other of said openings from the compartment communicating therewith when said valve means is in said one condition and fluid may be forced into the last-mentioned compartment from the compartment communicating with said one opening when said valve means is in said second condition.

2. Fluid control apparatus as set forth in claim 1, wherein is provided means biasing said member toward said one opening, whereby fluid is forced into said second conduit means when said valve means is in said second condition.

3. Fluid control apparatus as set forth in claim 1, wherein is provided means regulating the flow of fluid into said compartment communicating with said other opening to thereby permit variations of the time required for fluid to flow into the last-mentioned compartment from the compartment communicating with said one opening.

4. Fluid control apparatus as set forth in claim 1, wherein is provided third conduit means in fluid communication with said other opening for receiving fluid therefrom and for directing the fluid to a point of use as said member moves toward said other opening under the influence of fluid flowing through said one opening and into the compartment communicating therewith.

5. Fluid control apparatus as set forth in claim 1, wherein said member includes a bellows.

6. Fluid control apparatus as set forth in claim 5, wherein said bellows is provided with a wall secured to the inner surface of said receptacle.

7. Fluid control apparatus as set forth in claim 5, wherein said bellows is provided with a pair of opposed walls, one of said walls being secured to the inner surface of said receptacle, the other of said walls being movable toward and away from said one wall, and means biasing said other wall toward said one wall.

8. Fluid control apparatus as set forth in claim 1, wherein said changing means is adjustably coupled with said valve means to permit variations in the volume of fluid forced out of said other opening.

9. Fluid control apparatus as set forth in claim 1, wherein said changing means includes an actuator engaging said member and being movable therewith, said actuator being coupled to said valve means.

10. Fluid control apparatus as set forth in claim 9, wherein said valve means is disposed externally of said receptacle, said actuator extending through and being movable with respect to said receptacle.

11. Fluid control apparatus as set forth in claim 9, wherein said valve means includes a pair of valve sections and shiftable structure common to said valve sections, one of said sections corresponding to said first conduit means and the other of said sections corresponding to said second conduit means, said actuator being coupled with said structure.

12. Fluid control apparatus as set forth in claim 11, wherein said structure is movable between a pair of positions corresponding to respective operative conditions of said valve means, said actuator having means thereon for moving said structure after said member has moved a predetermined distance.

13. Fluid control apparatus as set forth in claim 12, wherein is provided means releasably maintaining said structure in a corresponding position until said structure is moved by said actuator after said member has moved through said distance.

14. Fluid control apparatus as set forth in claim 13 wherein said maintaining means includes a magnet adjacent to said structure, the latter being formed from a magnetically permeable material.

15. Fluid control apparatus as set forth in claim 1, wherein said changing means is disposed for changing the operative condition of said valve means after said member has moved through a predetermined distance.

16. Fluid control apparatus comprising:
   a closed receptacle having a pair of opposed ends each provided with an opening therethrough;
   a member within said receptacle between said ends and being movable alternately in opposed directions toward and away from each end respectively, said member being disposed for dividing said receptacle into a pair of compartments, one of said compartments communicating with one of said openings and the other of said compartments communicating with the other opening;
   means biasing said member toward said one opening;
   a first conduit connected at one end thereof to said receptacle in fluid communication with said one opening thereof, said first conduit being adapted for placing said one compartment in fluid communication with a source of fluid under pressure;
   a second conduit connected at the ends thereof to said receptacle in fluid communication with said openings to thereby place said compartments in fluid communication with each other;
   a third conduit coupled with said receptacle in fluid communication with said other opening and disposed for directing fluid passing out of said other compartment to a point of use;
   a valve having a pair of valve sections and shiftable structure common to said valve sections, one of the sections being coupled with said first conduit and the other section being coupled to said second conduit, said one section being disposed for permitting fluid flow through said one conduit when said structure is in one operative position and for blocking fluid flow therethrough when said structure is in a second operative position, said other section being disposed for blocking fluid flow through said second conduit when said structure is in said one position and for permitting fluid flow therethrough when said structure is in said second position; and
   means responsive to the movement of the member for moving said structure alternately into said positions.

References Cited by the Examiner

UNITED STATES PATENTS

| 2,814,422 | 11/1957 | Mercier | 222—341 X |
| 2,898,005 | 8/1959 | Rotter | 222—334 X |

FOREIGN PATENTS

| 311,858 | 5/1929 | Great Britain. |
| 1,057,484 | 5/1959 | Great Britain. |

LOUIS J. DEMBO, *Primary Examiner.*